(12) United States Patent
Mobini

(10) Patent No.: US 9,503,428 B2
(45) Date of Patent: Nov. 22, 2016

(54) SECURE DEVICE AND PROXY FOR SECURE OPERATION OF A HOST DATA PROCESSING SYSTEM

(71) Applicant: Zanguli LLC, Boca Raton, FL (US)

(72) Inventor: Behrooz Mobini, Rockville, MD (US)

(73) Assignee: ZANGULI LLC, Boca Raton, FL (US)

( * ) Notice: Subject to any disclaimer, the term of this patent is extended or adjusted under 35 U.S.C. 154(b) by 111 days.

(21) Appl. No.: 14/511,638

(22) Filed: Oct. 10, 2014

(65) Prior Publication Data

US 2016/0105398 A1    Apr. 14, 2016

(51) Int. Cl.
*H04L 29/06*    (2006.01)
*H04L 29/08*    (2006.01)

(52) U.S. Cl.
CPC ....... *H04L 63/0281* (2013.01); *H04L 63/1441* (2013.01); *H04L 67/125* (2013.01); *H04L 67/2876* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 5,546,463 A | | 8/1996 | Caputo et al. |
| 6,104,716 A | * | 8/2000 | Crichton ................ H04L 29/06 370/401 |
| 6,996,841 B2 | * | 2/2006 | Kadyk ................ H04L 63/0281 713/150 |
| 7,174,565 B2 | * | 2/2007 | Kadyk ................ H04L 63/0281 713/150 |
| 7,519,816 B2 | | 4/2009 | Phillips et al. |
| 7,617,527 B2 | * | 11/2009 | Bots ........................ H04L 12/46 708/203 |
| 7,712,086 B2 | | 5/2010 | Hughes et al. |
| 7,975,084 B1 | | 7/2011 | Kalbarga |
| 8,312,294 B2 | | 11/2012 | Sato et al. |
| 8,411,686 B2 | | 4/2013 | Wei |
| 8,489,860 B1 | | 7/2013 | McMahon et al. |
| 2008/0189554 A1 | | 8/2008 | Ali et al. |
| 2008/0250490 A1 | * | 10/2008 | Sriram ................ H04L 63/0281 726/12 |
| 2009/0070863 A1 | * | 3/2009 | Shimizu .............. H04L 63/0236 726/7 |
| 2009/0300196 A1 | * | 12/2009 | Haghpassand .......... G06F 21/50 709/229 |
| 2010/0174921 A1 | | 7/2010 | Abzarian et al. |
| 2012/0159521 A1 | | 6/2012 | Kriegelstein |
| 2012/0278866 A1 | | 11/2012 | Huang |
| 2013/0297830 A1 | | 11/2013 | Pao |
| 2014/0259109 A1 | * | 9/2014 | Houston ................. H04L 63/10 726/3 |
| 2015/0281261 A1 | * | 10/2015 | Kohanim ............ H04L 63/1408 726/26 |

FOREIGN PATENT DOCUMENTS

| | | |
|---|---|---|
| KR | 101349849 B1 | 1/2014 |
| WO | 2009038446 A1 | 3/2009 |

OTHER PUBLICATIONS

Wang, A. et al., "New Attacks and Security Model of the Secure Flash Disk," Mathematical and Computer Modelling vol. 57, Issue No. 11, Jun. 2013, Elsevier Ltd. © 2011, pp. 2605-2612.

* cited by examiner

*Primary Examiner* — Christopher Revak
(74) *Attorney, Agent, or Firm* — Curnot, Forsythe & Kim, LLC

(57) ABSTRACT

Secure device and proxy operation include generating, using a processor, a first proxy and a first proxy companion paired with the first proxy and providing the first proxy to a host data processing system for installation therein. The first proxy in the host data processing system and the first proxy companion communicate. A proxy change event for the host data processing system is detected. Responsive to the detecting, a second proxy and a second proxy companion paired with the second proxy are generated. The second proxy is provided to the host data processing system for installation therein.

20 Claims, 5 Drawing Sheets

SECURE DEVICE AND PROXY FOR SECURE OPERATION OF A HOST DATA PROCESSING SYSTEM

BACKGROUND

Users rely upon computers to perform many different tasks. Some tasks such as browsing a Website for pleasure may be considered to be of lesser importance by the user. When using a computer to perform tasks of lesser importance, the user may have little or no concern whether the computer is compromised in some way. For example, because the user is not sharing confidential information, the fact that the computer has a virus or other malware may not matter to the user.

Other tasks such as online banking, however, are likely considered to be of high importance to the user. When using the computer to perform tasks of high importance, the user may be providing confidential information to an online service provider, server, or the like. In such cases, the user is likely to be very concerned about the safety of using the computer and whether the computer has been compromised. A compromised computer may very well compromise the confidential information provided by user.

SUMMARY

A method includes generating, using a processor, a first proxy and a first proxy companion paired with the first proxy and providing the first proxy to a host data processing system for installation therein. The first proxy in the host data processing system and the first proxy companion communicate. The method includes detecting a proxy change event for the host data processing system and, responsive to the detecting, generating a second proxy and a second proxy companion paired with the second proxy and providing the second proxy to the host data processing system for installation therein.

A system may include a memory, a processor coupled to the memory, and an input/output (I/O) device coupled to the processor, wherein the processor is programmed to initiate executable operations. The executable operations include generating a first proxy and a first proxy companion paired with the first proxy, providing the first proxy to a host data processing system for installation therein using the I/O device, wherein the first proxy in the host data processing system and the first proxy companion communicate, and detecting a proxy change event for the host data processing system. The executable operations also include responsive to the detecting, generating a second proxy and a second proxy companion paired with the second proxy and providing the second proxy to the host data processing system for installation therein using the input/output device.

A computer program product includes a computer readable storage medium having program code stored thereon. The program code is executable by a processor to perform a method. The method includes generating, using the processor, a first proxy and a first proxy companion paired with the first proxy, providing, using the processor, the first proxy to a host data processing system for installation therein, wherein the first proxy in the host data processing system and the first proxy companion communicate, and detecting, using the processor, a proxy change event for the host data processing system. The method further includes, responsive to the detecting, generating, using the processor, a second proxy and a second proxy companion paired with the second proxy and providing, using the processor, the second proxy to the host data processing system for installation therein.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE SEVERAL VIEWS OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIGS. 3-1 and 3-2 are block diagrams illustrating exemplary implementations of the secure device of FIG. 1.

DETAILED DESCRIPTION

Figure 1:
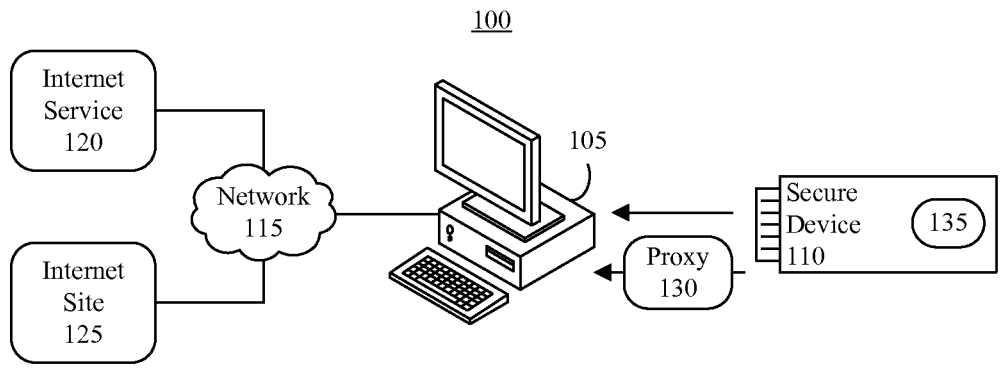
FIG. 1 is a block diagram illustrating an exemplary computing environment.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. The terms and phrases used within this disclosure are not intended to be limiting, but rather to provide an understandable description of the features described.

This disclosure relates to secure operation of a host data processing system. In accordance with the inventive arrangements disclosed herein, a secure device is provided that, when used in combination with a host data processing system, allows a user to perform various operations in a secure manner using the host data processing system. The user need not be concerned about whether the host data processing system is compromised.

In one aspect, the secure device is implemented as a secure and self-contained data processing system. The secure device is configured to generate a proxy and a proxy companion, which are paired for cooperative operation. The proxy is provided to the host data processing system responsive to the secure device being placed in communication with the host data processing system. The proxy may be installed within the host data processing system. The proxy companion remains within the secure device.

Once installed, the proxy companion within the secure device may communicate with the proxy within the host data processing system. The proxy companion may provide instructions to the proxy. The proxy executes the instructions through the host data processing system. Communication between the proxy and the proxy companion may be encrypted. The secure device may communicate with a user through peripherals of the host data processing system or through a hardware interface that is communicatively linked with the secure device. Further aspects of the inventive arrangements will be described herein with reference to the Figures below.

Several definitions that apply throughout this document now will be presented. As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an exemplary computing environment (environment) 100. Environment 100 includes a host data processing system (host) 105 and a secure device 110. Environment 100 may optionally include a network 115, one or more Internet services such as Internet service 120, and/or one or more Internet sites such as Internet site 125.

Host 105 may be implemented as a computer system such as a personal computer, a laptop, or the like. As pictured, host 105 may be communicatively linked to network 115. Network 115 is the medium used to provide communications links between various devices, services, data processing systems, servers, etc. within environment 100. Network 115 may include connections, such as wire, wireless communication links, or fiber optic cables. Network 115 may be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or the like.

Through network 115, host 105 may communicate with Internet service 120, Internet site 125, or one or more other data processing systems and/or servers also communicatively linked to network 115 not illustrated in FIG. 1. Internet service 120 and Internet site 125 are pictured for purposes of illustration only and, as such, are not intended as limitations of the inventive arrangements or the particular entities with which host 105 may communicate.

Secure device 110 may be implemented as a self-contained, secure computing system. Secure device 110, for example, may include a processor that executes program code. Secure device 110 may be implemented in a form factor of a peripheral device of host 105. Secure device 110 may include a physical connector that is configured to physically couple to a communication port of host 105. In one aspect, secure device 110 may include a housing including the processing components coupled to a wire, wires, or other circuitry with the wire(s) or other circuitry having such a physical connector. For example, secure device 110 may be implemented as, or within, a smart phone that connects to host 105 through a cable or over a wireless connection.

In another aspect, secure device 110 may be implemented in the form of a peripheral device of host 105. For example, secure device 110 may be implemented using a form factor, including the physical connector, of a Universal Serial Bus (USB) drive, e.g., a so called "thumb drive." In another example, secure device 110 may be implemented using the form factor of a compact flash card. The exemplary form factors provided are for purposes of illustration and not limitation. Other exemplary form factors may include any type of dongle with a connector, whether the connector is a "Lightning" connector, a Display Port connector, HDMI connector, or the like.

In one aspect, secure device 110 may be configured to draw power from the particular communication port of host 105 to which secure device 110 is coupled. In another aspect, secure device 110 may include a power source such as a battery. In still another aspect, secure device 110 may include a power connector and utilize an external power source. Secure device 110 further may include a combination of power sources such as an internal power source that may be charged from the host 105 through the cable or from an external power source.

In operation, secure device 110 is inserted into the communication port of host 105. Responsive to insertion into the communication port, secure device 110 generates two applications or programs. The first is a proxy 130 and the second is a proxy companion 135. Proxy 130 and proxy companion 135 are paired for cooperative operation and communication. For example, proxy 130 and proxy companion 135 each may include a shared key that may be used for secure and/or encrypted communications. Other aspects of proxy 130 and proxy companion 135 are described with reference to the remaining Figures.

As pictured, secure device 110 provides proxy 130 to host 105. Host 105 receives proxy 130 and automatically installs proxy 130 therein. Proxy companion 135 remains in secure device 110 and executes therein. Once proxy 130 is installed within host 105, proxy 130 and proxy companion 135 may communicate. Further, proxy 130 may receive one or more instructions from proxy companion 135 and/or from a user application executing in secure device 110. Proxy 130 executes or implements the received instructions using the available hardware resources of host 105. For example, the instructions from proxy companion 135 may instruct proxy 130 to communicate with Internet service 120 and/or Internet site 125. The communications may be secure communications, etc. Information received from Internet service 120 and/or Internet site 125 may be communicated from proxy 130 to proxy companion 135. The information received by proxy companion 135 may be provided or otherwise made available to a user of secure device 110 through any of a variety of mechanisms.

In one aspect, information received by proxy 130 from Internet service 120 and/or Internet site 125 may be provided to the user by display upon the display screen of host 105, playback through speakers or other audio transducive elements of host 105, or the like. In another aspect, information received by proxy 130 from Internet service 120 and/or Internet site 125 may be provided to proxy companion 135 and then provided to an optional hardware interface of secure device 110.

Figure 2:
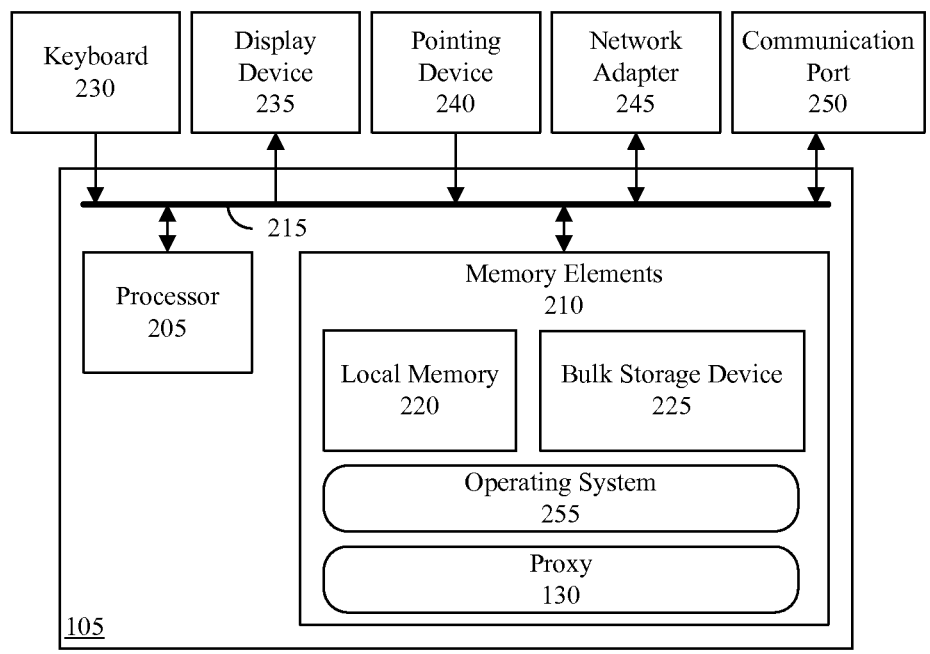
FIG. 2 is a block diagram illustrating an exemplary implementation of the host data processing system of FIG. 1.

FIG. 2 is a block diagram illustrating exemplary implementation of host 105 of FIG. 1. Host 105 includes at least one processor, e.g., a central processing unit (CPU), 205 coupled to memory elements 210 through a system bus 215 or other suitable circuitry. Host 105 stores program code within memory elements 210. Processor 205 executes the program code accessed from memory elements 210 via system bus 215. In one aspect, host 105 is implemented as a computer or other data processing system that is suitable for storing and/or executing program code. It should be appreciated, however, that system 200 can be implemented in the form of any system including a processor and memory that is capable of performing the functions described within this disclosure.

Memory elements 210 include one or more physical memory devices such as, for example, a local memory 220 and one or more bulk storage devices 225. Local memory 220 refers to random access memory (RAM) or other non-persistent memory device(s) generally used during actual execution of the program code. Bulk storage device 225 may be implemented as a hard disk drive (HDD), solid state drive (SSD), or other persistent data storage device. Host 105 may also include one or more cache memories (not shown) that provide temporary storage of at least some program code in order to reduce the number of times program code must be retrieved from bulk storage device 225 during execution.

Input/output (I/O) devices such as a keyboard 230, a display device 235, and a pointing device 240 may optionally be coupled to host 105. The I/O devices may be coupled to host 105 either directly or through intervening I/O controllers. A network adapter 245 may also be coupled to host 105 to enable host 105 to become coupled to other systems, computer systems, remote printers, and/or remote storage devices through intervening private or public networks. Modems, cable modems, Ethernet cards, and wireless transceivers are examples of different types of network adapter 245 that may be used with host 105. For example, host 105 may become coupled to Internet service 120 and/or Internet site 125 through network adapter 245.

Host 105 further may include a communication port 250 to enable host 105 to couple to other systems, computer systems, printers, and/or storage devices. Examples of communication port 250 may include, but are not limited to, a USB port, a Firewire (IEEE 1394) port, an eSATA port, a Display port, a Lightning port, or the like. For example, host 105 may become coupled to secure device 110 through communication port 250.

As pictured in FIG. 2, memory elements 210 may store an operating system 255. Further, once installed responsive to insertion of secure device 110 into communication port 250, memory elements 210 store proxy 130. Installing proxy 130 means that the necessary data for running or executing proxy 130 is written to bulk storage device 225 and available for execution using local memory 220. Operating system 255 and proxy 130, being implemented in the form of executable program code, are executed by host 105. As such, operating system 255 and proxy 130, once installed, are considered an integrated part of host 105. Host 105, while executing proxy 130, is able to respond and implement instructions received from secure device 110. Operating system 255, proxy 130, proxy companion 135, and any data items generated and/or used by operating system 255, proxy 130, and/or proxy companion 135 are functional data structures that impart functionality when employed as part of host 105, secure device 110, or another data processing system.

Figures 1, 3:
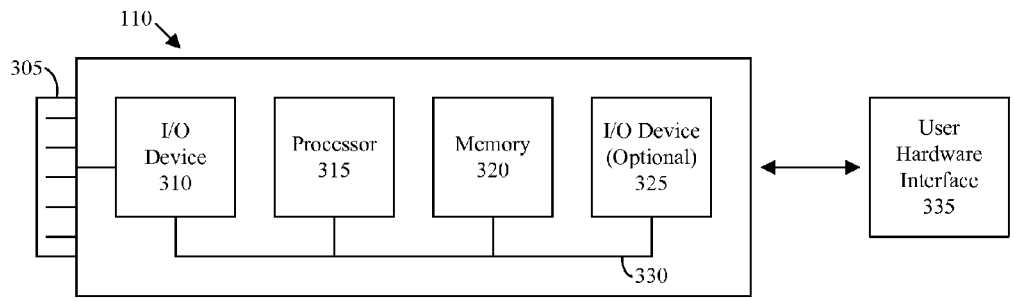
Figures 2, 3:
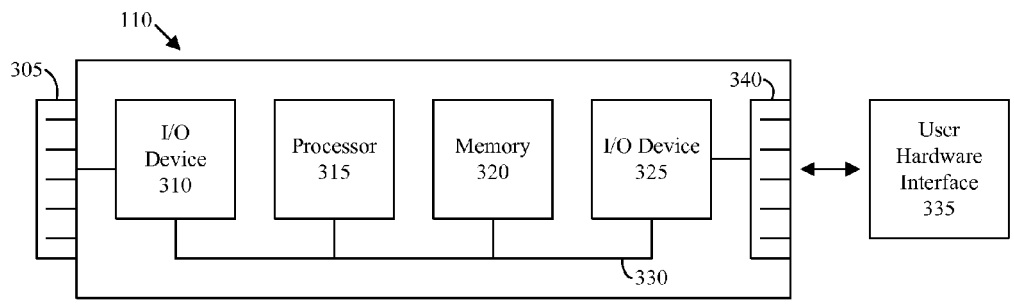

FIGS. 3-1 and 3-2 are block diagrams illustrating exemplary implementations of secure device 110 of FIG. 1. Referring to FIG. 3-1, secure device 110 includes a physical connector 305, an I/O device 310, a processor 315, a memory 320, and an optional I/O device 325.

Connector 305 is configured to connect or couple to communication port 250 of host 105. Exemplary form factors of connector 305 may include, but are not limited to, USB, micro-USB, Firewire, Lightning, eSATA, HDMI, or the like. I/O device 310 is coupled to connector 305. I/O device 305 may be implemented as a controller or other circuitry that is configured to communicate over the type of communication port to which connector 305 is coupled. For example, I/O device 310 may be implemented as a USB controller, a Firewire controller, a Lightning controller, an eSATA controller, an HDMI controller, or the like.

In one aspect, I/O device 310, processor 315, memory 320, and optional I/O device 325 may be coupled through a suitable communication bus 330 or other suitable circuitry. Memory 320 may include a local memory and a bulk storage device as previously described. Accordingly, memory 320 may store an operating system, one or more user applications, one or more generated proxies and one or more proxy companions. Processor 315 may access program code stored within memory 320 and execute such program code.

In one aspect, processor 315 may be a secure processor and memory 320 may be a secure memory. The term "secure" when combined with the term "processor" and/or the term "memory" means that both the processor and memory are implemented within a same integrated circuit and, more particularly, within a same substrate of an IC. Thus, in one aspect, processor 315 and memory 320, when implemented as a secure processor and a secure memory, may be implemented as part of a same IC and, more particularly, within the same substrate of the IC. In another aspect, either one or both of I/O device 310 and/or optional I/O device 325 also may be implemented within the same IC device, e.g., within the same substrate of the IC device, as processor 315 and memory 320.

I/O device 325, when included in secure device 110, is used to communicate with user hardware interface 335. Thus, in implementations where I/O device 325 is excluded from secure device 110, secure device 110 does not communicate with user hardware interface 335. Rather, secure device 110 utilizes the I/O devices of host 105 to communicate with the user by way of proxy 130.

In one aspect, I/O device 325 may be implemented as a wireless transceiver. For example, I/O device 325 may be implemented as a Bluetooth transceiver, a WiFi transceiver, Near Field Communication (NFC) transceiver, or the like. I/O device 325 may be paired with user hardware interface 335 to communicate. User hardware interface 335, for example, may include a display device, a processor or other controller, an I/O device such as a transceiver configured to communicate with I/O device 325, and a data input mechanism such as a keypad or a touch-enabled display screen.

In one example, user hardware interface 335 may be dedicated for communicating with secure device 110. The display may be a liquid crystal display or the like. In another example, user hardware interface 335 may be a smart phone, a tablet computing device, or the like, that executes suitable software thereby configuring user hardware interface 335 to communicate with secure device 110 by way of I/O device 325. In yet another example, user hardware interface 335 may be an NFC enabled smart card that is configured to provide information such as account information, financial account information, credentials of one form or another, or the like to a user application executing in secure device 110.

FIG. 3-2 illustrates another exemplary implementation of secure device 110. In the example of FIG. 3-2, an interface 340 is included. In that case, I/O device 325 may be implemented as a controller that operates through and/or with interface 340. Interface 340 may be a physical connector such as a USB port, a flash card port or slot, a display port, or any of a variety of connectors and/or card receiving interfaces such as card readers. In that case, user hardware interface 335 may become coupled to secure device 110 using interface 340. Accordingly, user hardware interface may have any of a variety of different form factors that may be plugged into or mechanically and electrically coupled with interface 340.

Figure 4:
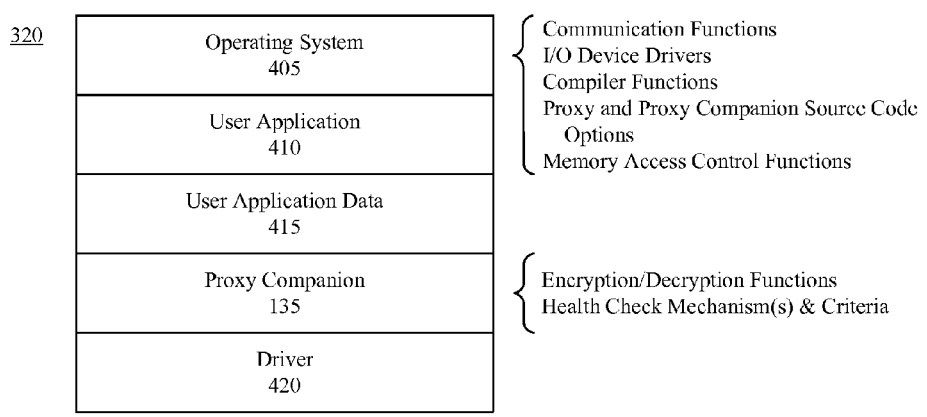
FIG. 4 is a block diagram illustrating an exemplary logical memory structure of the secure device.

FIG. 4 is a block diagram illustrating an exemplary logical memory structure of memory 320 of FIG. 3. FIG. 4 illustrates an example memory structure for memory 320 with secure device 110. The various portions illustrated may be placed in execution memory as needed for purposes of execution.

As shown, memory 320 stores an operating system 405, a user application 410, user application data 415, proxy companion 135, and a driver 420. It should be appreciated that while one user application is illustrated, memory 320 may include additional user applications. In that case, user application data 415 will include multiple user application data sections, e.g., one for each user application. Further, in the example shown, the proxy has been provided to host 105 and is therefore not shown.

Operating system 405 includes the various functions necessary for processor 315 to communicate with I/O device 310 and/or I/O device 325 (when included). Further, operating system 405 may include communication functions, I/O device drivers, compiler functions, proxy and proxy companion source code options, memory access control functions, or the like. The compiler functions perform program code generation, e.g., compilation, upon proxy and proxy companion source code to generate executable versions of the proxy and proxy companion. The proxy and proxy companion source code may include one or more versions of the various modules used in proxy and proxy companion generation, e.g., one or more different health check implementation mechanism options that may be selected and utilized by the compiler functions.

User application 410 may be any of a variety of applications stored in secure device 110. User application 410 is executed as an end-user application and interacts with proxy companion 135 to communicate with proxy 130 within host 105. Proxy 130 operates within host 105 to control various resources including I/O devices and network adapters of host 105. Proxy companion 135 is configured to communicate with proxy 130. Proxy companion 135 may include encryption/decryption functions, one or more health check mechanism, and the like. User application 410 provides instructions to proxy companion 135 and drives functionality therein. For example, user application 410 may be an application that is configured to communicate with a remove server, Internet service, Internet site, or the like such as user's banking institution or workplace computing system or server.

User application data 415 is a portion of memory 320 that user application 410 is permitted to utilize, e.g., read and/or write. Other portions of memory 320, e.g., operating system 405, proxy companion 135, etc., may not be accessed by user application 410. User application 410 is permitted to access only a limited portion of memory 320.

Driver 420 may be accessed by host 105 and executed. Driver 420, upon execution, installs the proxy within host 105. In this regard, driver 420 may be stored in a portion of memory 320 that is accessible by host 105 that allows driver 420 to be executed automatically or executed responsive to one or more user inputs and/or commands.

In another aspect, secure device 110 may store a developer application in memory 320. The developer application, for example, may provide a software development kit (SDK) that allows developers to create and install user applications such as user application 410 onto secure device 110. Through various mechanisms such as non-disclosure agreements, customization, controlled distribution, and the like, the operation of user applications and the developer application may be kept out of reach of attackers or otherwise unauthorized parties. In another aspect, once the developer application is used to install a user application, the developer application may become non-functional, destroyed, hashed out (e.g., overwritten using a hash pattern), and/or blacked out where the developer application may be left intact but with access to the program by users disabled.

In still another aspect, memory 320 may include a plurality of distinctly defined sections. The distinctly defined sections may be defined or otherwise maintained by operating system 405. Each section, for example, may have particular access rights defining the entities that may read and/or write to the section. In one aspect, each of the various applications and/or portions of program code illustrated in memory 320 in FIG. 4 may be regarded as a distinct section of memory having section-specific access rights. The sections may be defined across execution memory such as RAM and/or fixed storage.

In another aspect, memory 320 may include a plurality of sections with a first section that is visible to host 105. The first section may be used to initiate installation of proxy 130. For example, the first section may be read only for host 105 and used to store driver 420. New proxies may also be placed in the first section to be transferred to host 105. As such, the first section may be read and written by operating system 405, proxy companion 135, and/or user application 410. A second section may be used by the user application, e.g., user application data 415. The second section may be accessible by operating system 405 and/or proxy companion 135. The second section also may not be accessible by host 105. A third section may be used by operating system 405. The third section also may not be accessible by host 105. The third section may not be accessible by user application 410. In one aspect, cross memory access by proxy 130, proxy companion 135, and/or user application 410 may be governed by operating system 405.

Figure 5:
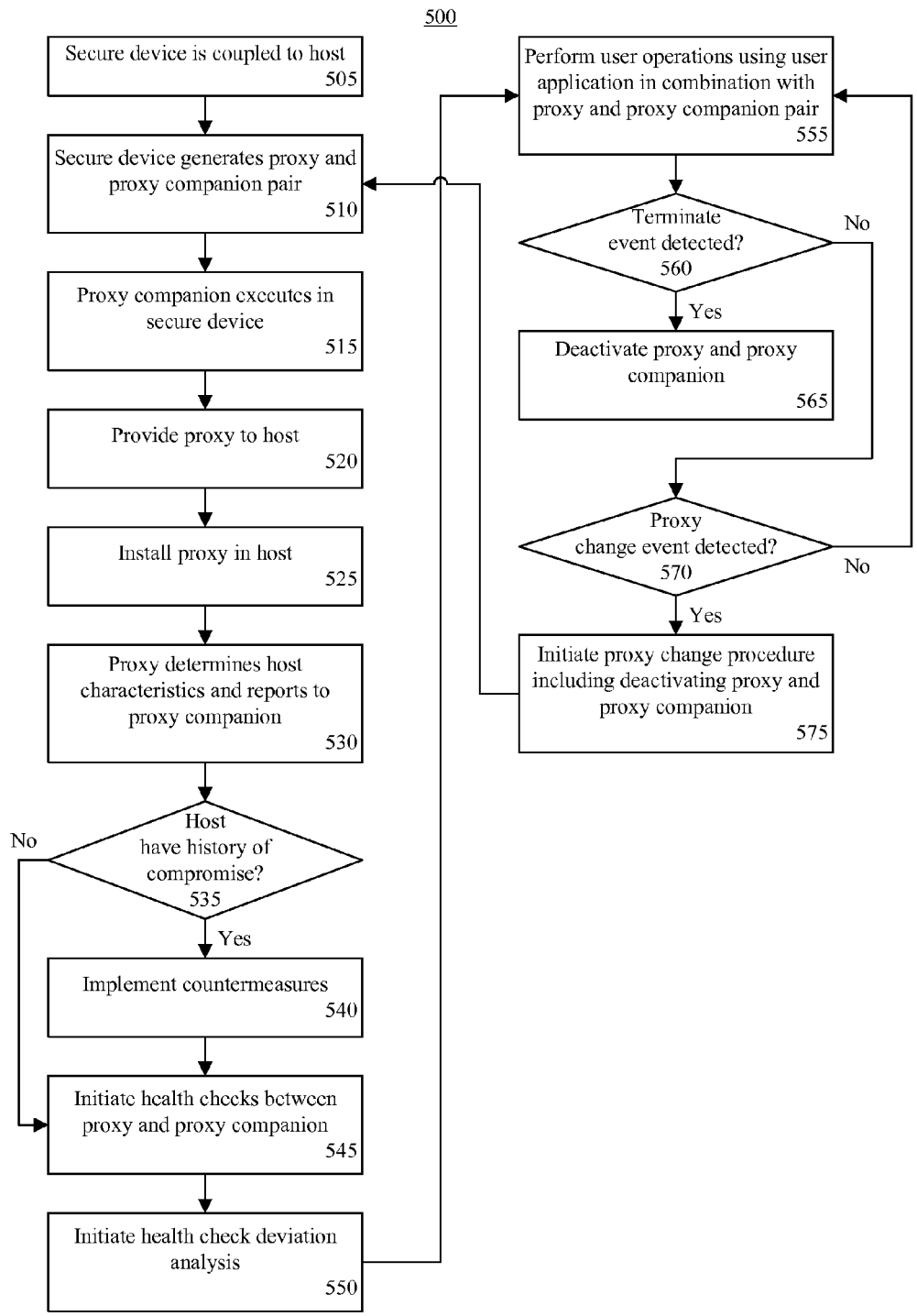
FIG. 5 is a flow chart illustrating an exemplary method of securely operating a host data processing system.

FIG. 5 is a flow chart illustrating an exemplary method 500 of securely operating a host data processing system such as host 105. Method 500 may be performed using a computing environment such as environment 100 of FIG. 1.

In block 505, the secure device is coupled to the host. For example, a user plugs the secure device into a communication port of the host. In block 510, the secure device generates a proxy and a proxy companion paired with the proxy. In one aspect, proxy and proxy companion generation, at least initially, may be performed responsive to the secure device automatically sensing being plugged into, or coupled to, a communication port of the host. Generation of a proxy and a proxy companion includes compiling the source code version of the proxy and proxy companion stored within memory 320 to generate an executable version of the proxy and the proxy companion. A proxy companion that is paired with the proxy is a proxy companion that is able to communicate through a shared encryption key, a private and/or standard communication protocol, both, etc. A proxy companion that is not paired with the proxy, is unable to communicate with the proxy. It should be appreciated that a communication protocol defines aspects of communication including, but not limited to, timing, commands, responses, and syntax of the communications exchanged.

In block 515, the secure device begins executing the proxy companion. More particularly, the processor of the secure device begins executing the proxy companion therein. In block 520, the secure device provides the proxy to the host. The processor, for example, sends the proxy to the I/O device of the secure device, which provides the proxy to the host. In one aspect, responsive to plugging the secure device into the communication port, the host locates a program, e.g., driver 420, in a portion of memory that is accessible to the host. The program, upon execution by the host, installs the proxy therein in block 525.

In block 530, the proxy determines one or more host characteristics that may be used as identifying information for the host. Examples of identifying information for the host include, but are not limited to, a MAC address, a CPU-ID, BIOS-ID, host-name, host-location, operating system version, or the like. One or more in any combination may be used as the identifying information for the host. The proxy reports the host characteristics to the proxy companion executing in the secure device. In block 535, the secure device determines whether the host has a history of compromise. For example, responsive to obtaining the identifying information, the processor executing the proxy companion compares the identifying information with a list of hosts that have been found to be compromised. The secure device may, responsive to determining that a host is compromised during operation, add the host to the list. As such, any host into which the secure device is plugged may be evaluated and compared with existing entries on the list to determine whether the secure device has already determined the current host to have been compromised at least one time prior.

If the secure device determines that the host has a history of compromise, method 500 may continue to block 540. If the secure device determines that the host does not have a history of compromise, e.g., the host is not found on the list, method 500 proceeds to block 545.

In block 540, the secure device implements one or more countermeasures. In one aspect, the countermeasures that are implemented may include more stringent requirements for implementing and/or performing health checks to be described herein in greater detail below. In another aspect, the countermeasures may include discontinuing further execution of the proxy and/or the proxy companion.

In block 545, the secure device initiates health checks between the proxy and the proxy companion. As defined herein, the term "health check" means a mechanism that is used by the secure device to determine whether the proxy executing in the host is functioning properly or is compromised, e.g., not functioning properly. Health checks may be performed between the proxy and the proxy companion. As such, the particular health checks that are performed between the host and the secure device are created and determined at the time that the proxy and the proxy companion are generated. Different proxy-proxy companion pairs may implement different health checks. Further, health checks may be enhanced or made more stringent through implementation of countermeasures as described in block 540.

In one aspect, a health check is a query and query response. The proxy companion initiates a query to the proxy. The proxy provides a health check message in response to the query. In another aspect, a health check may be the proxy providing a health check message to the proxy companion at predetermined times expected by the proxy companion. The proxy may be generated to send health checks at particular times during execution, periodically, or the like. In still another aspect, the query response, or health check message, may be expected by the proxy companion to specify particular data. The query response may be compared to an expected response. In the event that the query response does not match the expected response, the proxy is considered to be compromised. In the event that the message received from the proxy is not received at the expected time or within a predetermined amount of time from issuing the query, the proxy is considered to be compromised.

In the case where countermeasures are to be implemented in reference to block 540, the proxy companion may notify the proxy to escalate the health checks to a more stringent mechanism. A more stringent health check mechanism implemented in consequence of block 540 may include reducing the amount of time allowed to elapse between a query and a query response, increasing the length and/or complexity of expected content within a health check message, increasing the frequency of health checks, increasing the number of health checks and/or health check messages, or the like. In one aspect, the proxy companion instructs the proxy as to the particular health check mechanism that is to be implemented. In another aspect, the proxy and proxy companion implement a predetermined health check mechanism unless the proxy companion instructs the proxy to implement one or more countermeasures as described.

It also should be appreciated that the proxy and proxy companion may utilize more than one type of health check. For example, a query and query response mechanism may be used for a period of time, then switch to a mechanism where health check messages are expected from the proxy without first sending a query are used for a period of time, switching back to the query and query response mechanism, etc. The two mechanisms may be used in a rotational or turn-taking manner. An example of a countermeasure may include increasing the rotational frequency between the use of different measures or utilizing content checking in combination with the aforementioned counter measures.

In block 550, the proxy companion initiates health check deviation analysis. The proxy companion begins determining whether received health check messages meet established criteria. If so, the proxy companion determines that the proxy is healthy. If the health check message does not meet established criteria, the proxy companion determines that the proxy is not healthy, i.e., has been compromised.

In one aspect, the proxy companion compares content of the health check message with health check criteria. The health check criteria, for example, may include an expected health check message. If the content of the health check message matches the health check criteria, the proxy companion determines that the proxy is healthy, at least for the time being. In another aspect, the proxy companion compares timing of the health check message(s) with the health check criteria. In the case of a query/response type of health check, the proxy companion may determine whether the elapsed time between sending the health check query and receiving the health check message exceeds a predefined threshold. If so, the proxy companion determines that the proxy is compromised. If not, the proxy companion determines that the proxy is healthy.

In another timing example, the health check criteria may specify a timing window where the response must be received no earlier than 3 seconds after sending the query and no later than 4 seconds after sending the query. The particular times are exemplary only and may vary or be varied from one health check to another, for example, according to a schedule defining a shifting window of time. If the response to the query is received too quickly or too late, e.g., outside the window, the proxy companion determines that the proxy is compromised. If the reply is received within the window, the proxy companion determines that the proxy is functioning correctly.

It should be appreciated that, in reference to the countermeasures of block 430, the various health status criteria described, e.g., thresholds, times, health check message content, may be host specific. In another aspect, the health status criteria may be scaled according to a level of detected compromise in the host, or the like. The level of compromise may be determined by identifying the type of malware and/or virus in the host, correlating faster times to compromise from prior sessions with the secure device with higher levels of compromise, etc.

In still another timing example, in the case of the proxy providing health check messages without first being queried, the proxy companion may compare the time of the received health check message with a schedule that is specified within the health check criteria. The schedule may specify the expected times that health check messages are to be received, the time between consecutively received health check messages, which may differ, or the like. If the proxy companion determines that the health check messages do not comply with the schedule, the proxy companion determines that the proxy is compromised. If the proxy companion determines that the received health check message(s) do comply with the schedule, the proxy companion determines that the proxy is healthy at least for the time being.

In block 555, the secure device may execute a user application. Accordingly, the secure device performs user operations using the user application executing therein in combination with the proxy companion also executing therein and the proxy executing in the host. Instructions from the user application, for example, may be provided to the proxy companion. The proxy companion communicates any such instructions to the proxy executing in the host. Instructions may include, send data to a remote system, display this data upon the display screen of the host, or the like. Any data received by and/or generated by the proxy also may be communicated back to the proxy companion and on to the user application. The proxy companion further may provide such information to a user hardware interface if in use. In performing user operations, user input may be received through the host peripherals and/or through the user hardware interface if one is being used.

In one aspect, in block 555, the first proxy companion is allowed to instruct, e.g., by the secure device operating system, or instructs, the first proxy to cause the host data processing system to perform an operation responsive to determining that the health status message meets specified health criterion. If the health status messages does not meet the specified health criterion, the first proxy companion does not instruct the proxy or is prevented from instructing the proxy, e.g., the by secure device operating system.

In block 560, the secure device determines whether a terminate event has occurred. Examples of terminate events include, but are not limited to, the user quitting the user application executing in the secure device, removal of the secure device from the host communication port, or selecting to "eject" the secure device from the host. If a terminate event is detected, method 500 continues to block 565 where the proxy and proxy companion are deactivated.

In block 565, the proxy and the proxy companion are deactivated. In one aspect, deactivation includes the proxy companion instructing the proxy within the host to stop execution. In another aspect, the companion proxy may instruct the proxy to execute a function included as part of the proxy that uninstalls the proxy from the host. In still another aspect, the proxy companion may instruct the proxy to overwrite one or more portions of the installed proxy code with invalid and/or unexecutable program code thereby corrupting the proxy and preventing further execution of the proxy. Overwriting the proxy as described may be beneficial in cases where the proxy is unable to be uninstalled.

In addition, having instructed the proxy to take appropriate action, the proxy companion itself may stop execution, e.g., under control of the operating system of the secure device. In still another aspect, the current proxy companion may be deactivated by uninstalling or deletion from within the secure device, e.g., under control of the operating system of the secure device.

If a terminate event is not detected, method 500 may continue to block 570. In block 570, the secure device determines whether a proxy change event has occurred. If so, method 500 proceeds to block 575. If not, method 500 loops back to block 555 to continue performing user operations through execution of the user application.

An example of a proxy change event is a determination by the proxy companion that the proxy executing in the host is no longer healthy, e.g., has been compromised in some way. A proxy change event may be detected in the case where a comparison of a received health status message from the proxy does not comply with the health status criteria to which the health status message is compared. In another aspect, the proxy change event may be a request from the user application executing in the secure device. In still another aspect, a proxy change event may include the proxy companion periodically inducing and/or triggering a proxy change itself, e.g., by initiating a proxy change procedure within the operating system of the secure device. In any case, responsive to detecting a proxy change event, the proxy companion initiates a proxy change procedure within the secure device in block 575.

As part of block 575, the secure device deactivates the proxy and the proxy companion using any of the techniques described with reference to block 565. Further, method 500 loops back to block 510, where a new proxy and paired proxy companion are generated. Method 500 continues as described.

In generating the new proxy and the new proxy companion, the secure device implements a proxy and a proxy companion pair that is functionally equivalent to any prior proxy and proxy companion pair being replaced. While functionally equivalent, the newly generated proxy and proxy companion may be structurally different from the prior proxy and proxy companion pair. As defined herein, a "structural difference" means that the new, functionally equivalent proxy, as compared to the prior proxy, uses a different communication protocol, which may include different message timing, different message syntax, different commands, codes, and/or pneumonic, and/or locating portions of compiled program code (i.e., the executable) at different addresses or locations than the prior proxy implementation, use a different naming convention for program code modules contained therein, or any combination of the foregoing.

For example, referring to utilization of different addresses, the second proxy may include one or more portions of program code program code that are functionally equivalent to corresponding portions of program code in the first proxy, but which are located at different relative memory locations than in the first proxy. Thus, functionally equivalent modules or functions of the second proxy may be located at offsets from a base address of the second proxy that are different from the offsets used for the functionally equivalent versions of the functions in the first proxy. The process of using different addressing may be referred to as using different relative addressing. The relative addresses of equivalent functions may be changed or otherwise obfuscated from the first proxy to the second proxy during compilation. It should be appreciated that the same and/or similar structural differences may be applied in generating the proxy companion.

A communication function, for example, may be located at a different offset from a base address in the second proxy than in the first proxy. Further, obfuscation code may be inserted that is not exercised or no-operations (NOPs) may be included that varies the internal addressing of the second proxy compared to the first proxy.

Thus, the new proxy and proxy companion pair will differ from the prior proxy and proxy companion pair in a structural manner. The new proxy and proxy companion pair may include similar or same modules but be compiled in a way that locates the program code and/or modules at different address locations, e.g., randomizes the addresses and, thus, locations of the program code, uses a different naming technique for the modules during compilation. The new proxy and proxy companion pair also may utilize a different key than the prior proxy and proxy companion pair for conducting encrypted communications, though such a difference is not considered a structural difference.

One or more or all of the aforementioned techniques may be applied by the secure device in generating the new proxy and paired proxy companion. The secure device, for example, may store source code, apply one or more of the above processing techniques such as renaming modules, selecting one of a plurality of available communication protocols, selecting one of a plurality of keys and/or randomly generate a key for the proxy and paired proxy companion prior to and/or during generation, e.g., compilation, of the proxy and proxy companion. Selection of a particular health check mechanism to be used also may be performed during generation of the proxy and paired proxy companion. Include particular countermeasure(s) and/or countermeasure escalation path. Selection of a health check mechanism may include selecting query/query response, receiving health check messages without first querying, selecting the content of the health check messages, the formatting of the health check messages, generating a schedule of changing health check mechanisms and/or combinations of mechanisms, etc.

Figure 6:
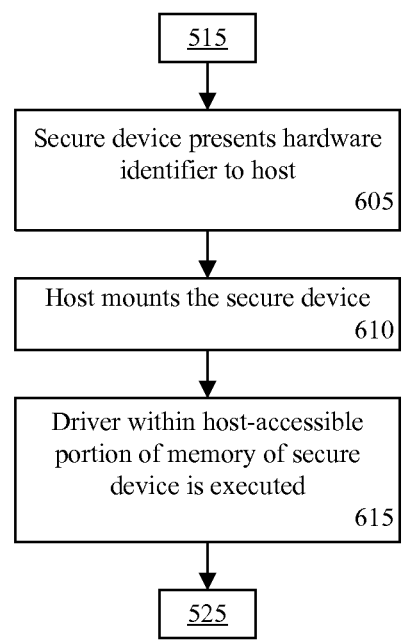
FIG. 6 is a flow chart illustrating an exemplary method providing a proxy to a host.

FIG. 6 is a flow chart illustrating an exemplary method providing a proxy to a host. More particularly, FIG. 6 illustrates an exemplary implementation of block 520 of FIG. 5. In block 605, the secure device may present a hardware identifier to the host.

In block 610, the host mounts the secure device. For example, the host may utilize the hardware identifier to select an internally stored driver that permits the host to view the file system, or a portion thereof, of the secure device. In one aspect, for example, the host may view the secure device as a USB drive or other form of bulk storage device. The portion of memory 320, for example, of the secure device may be exposed to the host through the driver located by the host using the hardware identifier. Accordingly, the file system to which the host has access may be limited to only those portions of memory 320 that are available to be read and/or written (if any) by the host.

In block 615, the driver within the host accessible portion of memory of the secure device is executed. For example, driver 420 may be executed. Driver 420 may be executed automatically using an auto-run functionality of enabled. In another aspect, a user may choose to view files in the host accessible portion of the secure device and select or execute the driver manually. It should be appreciated that the particular way in which the driver is executed within the secure device may vary according to the functionality, e.g., auto-run, which is enabled within the host. The driver, once executed from the secure device, installs the proxy within the host in performance of block 525.

Figure 7:
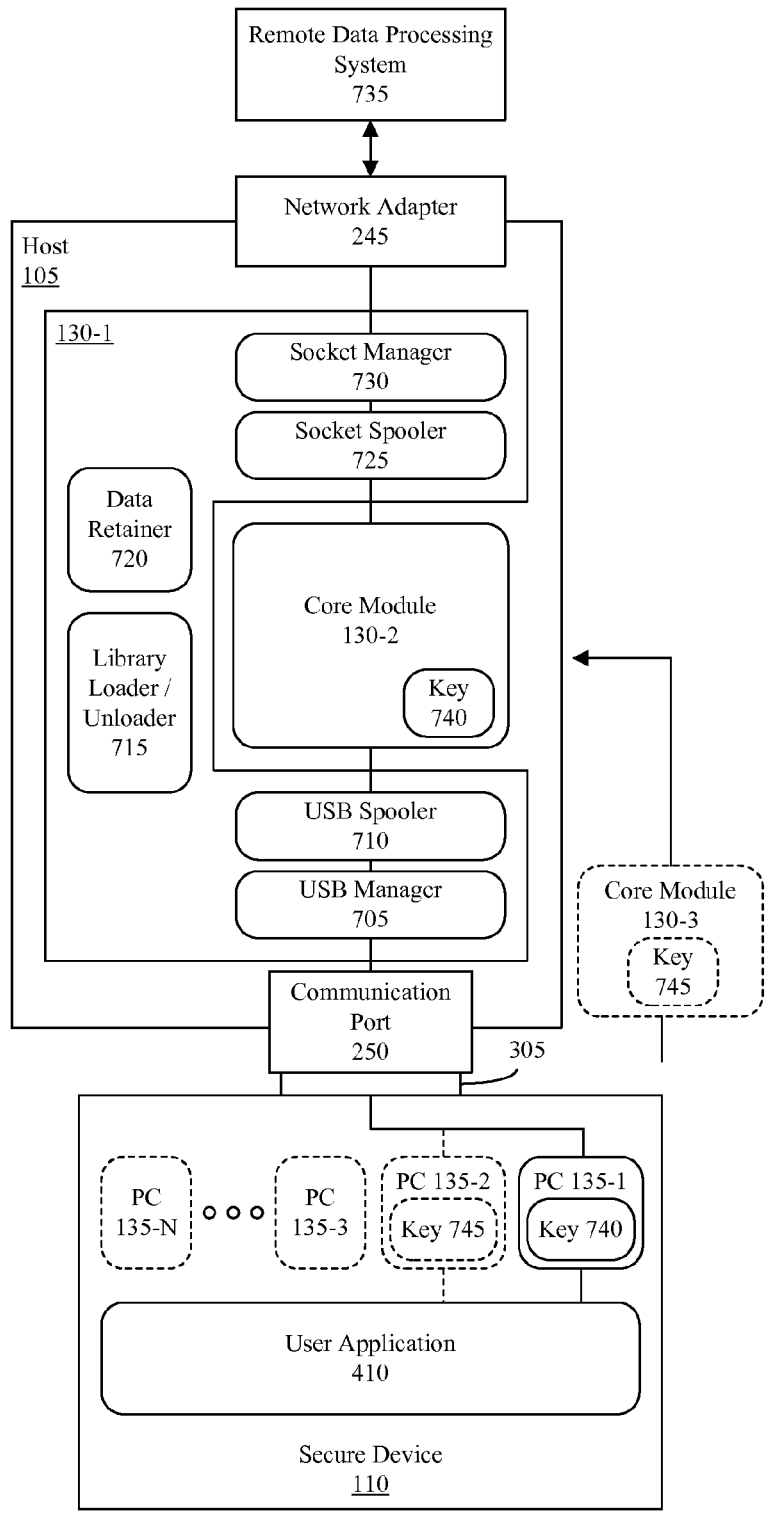
FIG. 7 is a block diagram illustrating the secure device and the host data processing system.

FIG. 7 is a block diagram illustrating secure device 110 and host 105. As pictured, secure device 110 is inserted into host 105. More particularly, connector 305 is inserted into communication port 250 of host 105. In the example of FIG. 7, connector 305 is a USB connector and communication port 250 is a USB port.

Secure device 110 includes a user application 410. User application 410 communicates with proxy companion (abbreviated as "PC" in FIG. 7) 135-1. Proxy companion 135-1 accesses connector 305 for communicating with host 105. In the example of FIG. 7, only proxy companion 135-1 has been generated and is executing. Proxy companions 135-2, 135-3, through 135-N have not been generated. The dashed lines of proxy companions 135-2, 135-3, and 135-N and the dashed connections relating to proxy companion 135-2 are used to illustrate that while not generated or currently existing in secure device 110, such proxy companions may be generated to replace proxy companion 135-1 using a proxy change procedure as previously discussed or one similar thereto.

Within host 105, proxy 130 has been installed. In the example of FIG. 7, proxy 130 includes two components illustrated as proxy framework 130-1 and a core module 130-2. Proxy framework 130-1 and core module 130-2 (or any core module in operation within host 105) collectively may be referred to as proxy 130. Proxy framework 130-1 includes a USB manager 705, a USB spooler 710, a library loader/unloader 715, a data retainer 720, a socket spooler 725, and a socket manager 730. Socket manager 730 is in communication with network adapter 245, which may communicate with one or more other data processing systems such as remote data processing system 735.

FIG. 7 illustrates that subsequent to installation of proxy 130 in host 105, proxy 130 includes one or more low level connection modules such as USB manager 705, USB spooler 710, socket spooler 725, and socket manager 730 within proxy framework 130-1. These low level modules facilitate communication between proxy 130 and proxy companion 135-1. Further, these low level modules facilitate communication between proxy 130 and remote data processing system 735.

Core module 130-2, which is also installed as part of proxy 130, is configured, or includes functions, for performing operations such as encryption, decryption, calculations, sending data to a display device of host 105, performing logins on remote data processing system 735, etc. For example, core module 130-2 may include a particular key 740 for use in performing encryption and/or decryption operations for data or communications exchanged between proxy 130 and proxy companion 135-1. Core module 130-2 is paired with proxy companion 135-1. For example, proxy companion 135-1 also may include key 740. It should be appreciated that an encryption and/or decryption performed for communicating between proxy 130 and proxy companion 135 may be independent of encryption and/or decryption performed on data exchanged between proxy 130 and remote data processing system 735 or between proxy companion 135-1 and remote data processing system 735. In general, core module 130-2 implements the user application's operations within host 105 as initiated by user application 410. In one aspect, core module 130-2 may be implemented as one or more shared libraries such as one or more Dynamic-Link Libraries (DLLs), one or more dylib(s), one or more Frameworks, or the like depending upon the particular operating system that is used by host 105.

Once proxy 130 is installed and communicating with proxy companion 135-1, a user may utilize host 105 to interact with remote data processing system 735. For example, the user's credentials may be stored within user application 410. The user's credentials may be securely provided to remote data processing system 735 by: user application 410 providing the credentials and login instructions to proxy companion 135-1, proxy companion 135-1 communicating the login instructions and credentials to proxy 130, and proxy 130 executing the instructions thereby logging into remote data processing system 735 securely using the credentials provided regardless of whether host 105 is compromised. Data received back from remote data processing system 735 may be provided to proxy 130. Proxy 130 may display results on the display of the host and/or provide results to proxy companion 135-1, which may provide the results to user application 410. The user may securely perform online banking, access terminal services, or the like in the manner described. Proxy 130, for example, may include one or more other modules that allow user application 410 to access the display device and/or other peripherals such as keyboard and mouse and provide user input by way of such peripherals of host 105. As also discussed, secure device 110 may couple to another local user hardware interface 335 in lieu of, or in addition to, accessing I/O devices of host 105.

At some point in time, responsive to a proxy change event, proxy 130 is changed along with proxy companion 135-1. In the example of FIG. 7, however, rather than changing the entirety of proxy 130, i.e., both proxy framework 130-1 and core module 130-2, only core module 130-2 is changed. Proxy companion 135-1 is specifically paired with core module 130-2 and is changed. Proxy framework 130-1 provides functionality that may be used by any new core module loaded into host 105. Accordingly, proxy framework 130-1 is left executing within host 105.

For purposes of illustration, in this example, user application 410 requests initiation of the proxy change procedure. Proxy companion 135-1 instructs proxy 130 to discontinue communication. In one aspect, proxy companion 135-1 commands core module 130-2 that a proxy change procedure is requested. For example, proxy 130 may be instructed to discontinue communication through one or more or all of the peripherals of host 105, which include I/O devices of host 105. Thus, any communication taking place between the proxy (e.g., host 105) and remote data processing system 735 is discontinued. In addition, operation of other peripherals of host 105 such as keyboards, mice, network adapters, communication ports other than communication port 250, etc., may also be temporarily discontinued. As part of the discontinuation, any data in route to core module 130-2 may continue to be spooled and not delivered by USB spooler 710. Similarly, socket spooler 725 may continue to spool data in route to remote data processing system 735 and not deliver such data. Any intermediate data, e.g., data already within core module 130-2 may be stored in data retainer 720.

Secure device 110, e.g., the operating system therein, generates a new proxy companion 135-2 and a new core module 130-3 also shown with dashed line. Core module 130-3 and proxy companion 135-2 share the same key 745, which is different than key 740. Core module 130-3 and proxy companion 135-2 may differ from the prior core module and proxy companion in other ways previously discussed. These differences mean that a vulnerability discovered in core module 130-2 will not likely be exploitable or exist in the core module 130-3 that is generated. An attacker may need to start anew attempting to compromise core module 130-3.

Once core module 130-3 and proxy companion 135-2 are generated, core module 130-3 is provided to proxy framework 130-1. While core module 130-3 is illustrated next to host 105, such positioning is for purposes of illustration. Those skilled in the art will appreciate that core module 130-3 is provided from secure device 110 through connector 305 to communication port 250 and into to host 105. Core module 130-2, having been notified of the proxy change procedure, instructs library loader/unloader 715 to unload and/or unlink core module 130-2 (i.e., unload itself) and load and link core module 130-3 provided from secure device 110. In one aspect, core module 130-3 may be transmitted by proxy companion 135-1 and provided to core module 130-2 prior to unlinking core module 130-2. Core module 130-2 provides core module 130-3 to library loader/unloader 715 for linking Subsequent thereto, core module 130-2 is unloaded and/or unlinked. In that case, encryption may be applied to core module 130-3. In another aspect, library loader/unloader 715 may receive the proxy change request command and obtain core module 130-3 without the aid of core module 130-2 or proxy companion 135-1. Core module 130-2 may have already been unlinked and/or unloaded. In one example, library loader/unloader 715 may obtain core module 130-3 from proxy companion 135-2 once executing in secure device 110.

Subsequently, core module 130-3 is activated, any intermediate data stored in data retainer 720 is restored to core module 130-3. Socket spooler 725 and USB spooler 710 are permitted to unspool and resume operation. Proxy 130, which is now formed of proxy framework 130-1 and core module 130-3 may then resume communication and operations with remote data processing system 735. Any disabled systems of host 105 may also be enabled under control of proxy 130. Proxy companion 135-1 is purged or deleted, while proxy companion 135-2 communicates with proxy 130 and, more particular core module 130-3 and proxy framework 130-1.

In another aspect, user application 410 may have a corresponding, or paired program, e.g., a "peer program," executing in remote data processing system 735. In that case, user application 410 and the remote peer program may share keys to communicate securely. Communication between user application 410 and the peer program may not be visible by host 105 or the operating system contained therein. Similarly, the proxy and/or proxy companion may not be able to decrypt communication between application 410 and the peer program in remote data processing system 735. Thus, a first level of encryption may be used between proxy and proxy companion pairs, while a second and independent, e.g., different key and/or entirely different encryption/decryption scheme, may be used between the user application and its peer application in the remote data processing system. Further secure communications protocols, e.g., secure socket layer or the like, may be implemented by network adapter 245 under control of proxy framework 130-1.

Because the proxy is structurally changed and re-installed, an attacker gaining access to the program code will not be able to directly compromise the newly generated proxy installed within host 105. Further, the attacker is unable to anticipate the structural changes in the new proxy. Accordingly, compromise of the new proxy will take further time to perform analysis, reverse engineering, or other procedures directed at compromising the newly generated and installed proxy.

The number of permutations that may be generated for the proxy and proxy companion pair may be on the order of hundreds, thousands, tens of thousands, hundreds of thousands, or even millions, thereby rendering the process of attacking all possible structural permutations of the proxy and/or proxy companion difficult.

In accordance with the inventive arrangements disclosed herein, a secure device is provided that, when used in combination with a host data processing system, allows a user to perform various operations in a secure manner using the host data processing system. The user need not be concerned about whether the host data processing system is compromised. The secure device is able to install one or more modules in the host system and securely communicate with the modules to allow a user application executing in the secure device to effectively control the host. Modules within the host may be replaced from time-to-time as may be required to avoid a situation in which the module(s) are or become compromised by an attacker. As such, a user may utilize the host to access various services and/or remote data processing systems without fear that the user's data and/or other communications are being intercepted or otherwise accessed by unauthorized parties, e.g., attackers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The terminology used herein is for the purpose of describing particular embodiments only and is not intended to be limiting of the inventive arrangements. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," "responsive to detecting," depending on the context. Similarly, the phrase "if it is determined" or "if [a stated condition or event] is detected" may be construed to mean "upon determining" or "in response to determining" "responsive to determining" or "upon detecting [the stated condition or event]" or "in response to detecting [the stated condition or event]" or "responsive to detecting [the state condition or event]" depending on the context.

A method includes generating, using a processor, a first proxy and a first proxy companion paired with the first proxy and providing the first proxy to a host data processing system for installation therein. The first proxy in the host data processing system and the first proxy companion communicate. The method includes detecting a proxy change event for the host data processing system and, responsive to the detecting, generating a second proxy and a second proxy companion paired with the second proxy and providing the second proxy to the host data processing system for installation therein.

In one aspect, the second proxy is structurally different from the first proxy and functionally equivalent to the first proxy. For example, the second proxy may be structurally different by using different relative addresses for program code. In another example, the second proxy may be structurally different by using a different communication protocol.

The method may include instructing the host data processing system to deactivate the first proxy.

The method may include receiving a health status message from the first proxy within the host data processing system and comparing the health status message with at least one health status criterion. For example, the method may include allowing the first proxy companion to instruct the first proxy to cause the host data processing system to perform an operation responsive to determining that the health status message meets the at least one health criterion. In another aspect, detecting a proxy change event includes determining that the health status message does not meet the at least one health criterion.

The method may include the first proxy companion instructing the first proxy to cause the host data processing system to perform an operation specified by a user application.

The method also may include receiving identifying information for the host data processing system from the first proxy, comparing the identifying information with a list of compromised host data processing systems, and responsive to matching the identifying information with an entry in the list, implementing at least one countermeasure.

In one example, implementing the at least one countermeasure may include increasing a frequency of health check messages between the first proxy and the first proxy companion. In another example, implementing the at least one countermeasure may include increasing a number of health check messages. In still another example, implementing the at least one countermeasure may include increasing a complexity of content of health check messages between the first proxy and the first proxy companion. In yet another example, implementing the at least one countermeasure may include decreasing allowed time for receipt of a health check message from the proxy.

In a further aspect, the proxy includes a proxy framework and a core module. In that case, generating a second proxy and a second proxy companion paired with the second proxy and providing the second proxy to the host data processing system for installation therein further may include generating a new core module, providing the new core module to the host, unlinking and unloading the core module, and loading and linking the new core module.

In still another aspect, generating a second proxy and a second proxy companion paired with the second proxy and providing the second proxy to the host data processing system for installation therein further may include discontinuing data transfer between the proxy companion and the proxy and between the proxy and a peripheral device of the host data processing system until the new core module is loaded and linked, storing intermediate data from the core module within the core framework, and restoring the intermediate data to the new core module responsive to loading and linking the new core module.

A system may include a memory, a processor coupled to the memory, and an input/output (I/O) device coupled to the processor, wherein the processor is programmed to initiate executable operations. The executable operations include generating a first proxy and a first proxy companion paired with the first proxy, providing the first proxy to a host data processing system for installation therein using the I/O device, wherein the first proxy in the host data processing system and the first proxy companion communicate, and detecting a proxy change event for the host data processing system. The executable operations also include responsive to the detecting, generating a second proxy and a second proxy companion paired with the second proxy and providing the second proxy to the host data processing system for installation therein using the input/output device.

In one aspect, the second proxy is structurally different from the first proxy and functionally equivalent to the first proxy.

A computer program product includes a computer readable storage medium having program code stored thereon. The program code is executable by a processor to perform a method. The method includes generating, using the processor, a first proxy and a first proxy companion paired with the first proxy, providing, using the processor, the first proxy to a host data processing system for installation therein, wherein the first proxy in the host data processing system and the first proxy companion communicate, and detecting, using the processor, a proxy change event for the host data processing system. The method further includes, responsive to the detecting, generating, using the processor, a second proxy and a second proxy companion paired with the second proxy and providing, using the processor, the second proxy to the host data processing system for installation therein.

In one aspect, the second proxy is structurally different from the first proxy and functionally equivalent to the first proxy.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   generating, using a processor of a device, a first proxy and a first proxy companion paired with the first proxy;
   providing the first proxy from the device to a host data processing system for installation therein;
   wherein the first proxy in the host data processing system and the first proxy companion communicate;
   detecting a proxy change event from the host data processing system indicating that the first proxy is compromised within the host data processing system; and
   responsive to the detecting, generating, using the processor of the device, a second proxy and a second proxy companion paired with the second proxy and providing the second proxy from the device to the host data processing system for installation therein;
   wherein the first and second proxies are programs configured to execute in the host data processing system, and the first and second proxy companions are programs configured to execute in the device.

2. The method of claim 1, wherein the second proxy is structurally different from the first proxy and functionally equivalent to the first proxy.

3. The method of claim 2, wherein the second proxy has a portion of program code program code that is functionally equivalent to a corresponding portion of program code in the first proxy that is located at different relative memory location than in the first proxy.

4. The method of claim 2, wherein the second proxy uses a different communication protocol than the first proxy.

5. The method of claim 1, further comprising:
   instructing the host data processing system to deactivate the first proxy.

6. The method of claim 1, further comprising:
   receiving a health status message from the first proxy within the host data processing system; and
   comparing the health status message with at least one health status criterion.

7. The method of claim 6, further comprising:
   allowing the first proxy companion to instruct the first proxy to cause the host data processing system to perform an operation responsive to determining that the health status message meets the at least one health criterion.

8. The method of claim 6, wherein detecting a proxy change event comprises:
   determining that the health status message does not meet the at least one health criterion.

9. The method of claim 1, further comprising:
   the first proxy companion instructing the first proxy to cause the host data processing system to perform an operation specified by a user application.

10. The method of claim 1, further comprising:
    receiving identifying information for the host data processing system from the first proxy;
    comparing the identifying information with a list of compromised host data processing systems; and
    responsive to matching the identifying information with an entry in the list, implementing at least one countermeasure.

11. The method of claim 10, wherein implementing the at least one countermeasure comprises:

increasing a frequency of health check messages between the first proxy and the first proxy companion.

12. The method of claim 10, wherein implementing the at least one countermeasure comprises:
increasing a complexity of content of health check messages between the first proxy and the first proxy companion.

13. The method of claim 10, wherein implementing the at least one countermeasure comprises:
decreasing allowed time between receipt of a health check message from the proxy.

14. The method of claim 1, wherein:
the proxy comprises a proxy framework and a core module; and
generating a second proxy and a second proxy companion paired with the second proxy and providing the second proxy to the host data processing system for installation therein further comprises:
generating a new core module;
providing the new core module to the host;
unlinking and unloading the core module; and
loading and linking the new core module.

15. The method of claim 14, wherein generating a second proxy and a second proxy companion paired with the second proxy and providing the second proxy to the host data processing system for installation therein further comprises:
discontinuing data transfer between the proxy companion and the proxy and between the proxy and a peripheral device of the host data processing system until the new core module is loaded and linked;
storing intermediate data from the core module within the core framework; and
restoring the intermediate data to the new core module responsive to loading and linking the new core module.

16. The method of claim 15, further comprising:
discontinuing data transfer between the proxy and a remote data processing system.

17. A system comprising:
a memory;
a processor coupled to the memory;
an input/output device coupled to the processor;
wherein the processor is programmed to initiate executable operations comprising:
generating a first proxy and a first proxy companion paired with the first proxy;
providing the first proxy to a host data processing system for installation therein using the input/output device;
wherein the first proxy in the host data processing system and the first proxy companion communicate;
detecting a proxy change event from the host data processing system indicating that the first proxy is compromised within the host data processing system; and
responsive to the detecting, generating a second proxy and a second proxy companion paired with the second proxy and providing the second proxy to the host data processing system for installation therein using the input/output device;
wherein the first and second proxies are programs configured to execute in the host data processing system, and the first and second proxy companions are programs configured to execute in the device.

18. The system of claim 17, wherein the second proxy is structurally different from the first proxy and functionally equivalent to the first proxy.

19. A computer program product comprising a computer readable storage medium having program code stored thereon, the program code executable by a processor to perform a method comprising:
generating, using the processor of a device, a first proxy and a first proxy companion paired with the first proxy;
providing, using the processor, the first proxy from the device to a host data processing system for installation therein;
wherein the first proxy in the host data processing system and the first proxy companion communicate;
detecting, using the processor, a proxy change event from the host data processing system indicating that the first proxy is compromised within the host data processing system; and
responsive to the detecting, generating, using the processor of the device, a second proxy and a second proxy companion paired with the second proxy and providing, using the processor, the second proxy from the device to the host data processing system for installation therein;
wherein the first and second proxies are programs configured to execute in the host data processing system, and the first and second proxy companions are programs configured to execute in the device.

20. The computer program product of claim 19, wherein the second proxy is structurally different from the first proxy and functionally equivalent to the first proxy.

* * * * *